United States Patent

Halbrook

[11] Patent Number: 5,987,436
[45] Date of Patent: Nov. 16, 1999

[54] OBLIGATED INVESTMENT SYSTEM

[76] Inventor: W. Bracey Halbrook, 4403 Sunnybrook Dr., Nashville, Tenn. 37205-3838

[21] Appl. No.: 09/237,630

[22] Filed: Jan. 26, 1999

[51] Int. Cl.[6] .................................................. G06F 19/00
[52] U.S. Cl. .............................. 705/38; 705/35; 705/36
[58] Field of Search ................................ 705/38, 35, 36, 705/39; 707/503

[56] References Cited

U.S. PATENT DOCUMENTS

| | | | |
|---|---|---|---|
| 4,876,648 | 10/1989 | Floyd ........................................ | 364/408 |
| 4,953,085 | 8/1990 | Atkins ...................................... | 364/408 |
| 5,644,727 | 7/1997 | Atkins ...................................... | 705/40 |
| 5,673,402 | 9/1997 | Ryan et al. .............................. | 395/238 |
| 5,689,649 | 11/1997 | Altman et al. .......................... | 395/236 |
| 5,761,441 | 6/1998 | Bennett .................................... | 395/235 |
| 5,787,404 | 7/1998 | Fernandez-Holmann ................ | 705/35 |

*Primary Examiner*—Allen R. MacDonald
*Assistant Examiner*—Penny Caudle
*Attorney, Agent, or Firm*—Luedeka, Neely & Graham, P.C.

[57] ABSTRACT

A financial management data processing system determines monetary amounts related to a loan. The loan consists of a base loan amount to be used by a borrower, for which a lender charges the borrower an interest amount at a loan interest rate over a loan term. The loan also consists of an investment loan amount to be invested in an investment that earns a return on the investment at a rate of return. Information input means are included for inputting the base loan amount, the investment loan amount, the loan interest rate, the rate of return on the investment, and the loan term. First data processing means (i) sum the base loan amount and the investment loan amount to produce a principal amount, (ii) determine the interest amount based on the principal amount, the loan interest rate, and the loan term, (iii) amortize the loan based upon the loan interest rate and the loan term to determine an interest payment amount and a principal payment amount, and (iv) determine a loan payment amount by combining the interest payment amount and principal payment amount. Second data processing means determine the return on the investment based on the investment loan amount and the rate of return on the investment. Third data processing means apply at least a portion of the return on the investment to reduce at least one of the principal amount and the interest amount. Output means display results of determinations made by the first, second, and third data processing means.

20 Claims, 12 Drawing Sheets

```
A:\HALBRO~1.EXE                                              _ 🗗 ×
SUMMARY OF TRANSACTIONS
Loan Composition:
                Standard Loan           Halbrook Loan
                -------------           -------------------------
Loan            $100000                 $120000
Amount Loan            30                      30
Length (years)

Interest        8%                      8%
Rate

Monthly         $733.76
Payment                                 $880.52
(Additional:)                           $146.75

Loan            0                       $20000
Amount Invested
(Pct.)          (0.0%)                  (16.6667%)

Division        N/A                     0%      (investment)
of Equity                               100%    (purchase)
Print summary of portfolio investments?_
```

Fig. 16

```
A:\HALBRO~1.EXE                                              _ 🗗 ×
Investment      Amount          Expected        Value (Est.) at
                                Return          Loan Completion
----------      ------          --------        ---------------
mutual_fund
                $20000          15%             $1324235.44

TOTALS          $20000          15.00%          $1324235.44
Print Amortization Schedule (Standard Method)? [y/n]_
```

Fig. 17

```
A:\HALBRO~1.EXE
Year of Move or Default: 30

Loan       Initial     Investment PROFIT      Assets     Dollar   Customer
Process    Repayment   Value      to          Upon       per      Profit on
Used                              Customer    Completion Dollar   Default
-------    ---------   ---------- ---------   ---------- ------   ---------
Halbrook   $316986.30  $1324235.44 $1127249.14 $1324235.44  9.39    $1424235.44

-------    ---------   ---------- ---------   ---------- ------   ---------
Standard   $264155.25     N/A      $-164155.25    N/A      -2.64   $100000.00
Loan
-------    ---------   ---------- ---------   ---------- ------   ---------
EXTRA      $ 52831.05  $1324235.44 $1291404.39 $1324235.44 12.04   $1324235.44
VALUE via Halbrook
Print out Lender Comparisons? [y/n]
-
```

Fig. 18

```
A:\HALBRO~1.EXE
Year of Move or Default: 30

Loan       Customer  TOTAL       Additional
Process    Monthly   Repayment   Profit
           Payment               (percent)  (gross)     (net)
-------    --------  ---------   ---------  ---------   --------
Halbrook   $ 880.52  $316986.30    32.18    $ 52831.05  $ 39623.29
-------    --------  ---------   ---------  ---------   --------
Standard   $ 733.76  $264155.25     N/A        N/A         N/A
-------    --------  ---------   ---------  ---------   --------
via        $ 146.75  $ 52831.05    32.18    $ 52831.05  $ 39623.29
HALBROOK Lender     Dollar    P.I.Inc
Profit     per       Licensing
(Default)  Dollar    Fee
---------  ------    ---------
$317866.81   2.64    $ 13207.76
---------  ------    ---------
$264889.01   2.64       N/A
---------  ------    ---------
$ 52977.80
Print out Yearly Customer Comparisons? [y/n]
-
```

OBLIGATED INVESTMENT SYSTEM

FIELD

This invention relates to the field of financial investment systems. More particularly the invention relates to a system for managing and accelerating repayment of a loan.

A source code microfiche appendix having one slide and 30 total frames is appended hereto. The code listed in the microfiche appendix details actual implementation of some of the methods and apparatuses described herein.

BACKGROUND

Borrowers enter into loan agreements with lending institutions to make a wide variety of purchases. For example, a home purchaser enters into a mortgage loan to finance the home, and an automobile purchaser enters into an automobile loan to finance the purchase of the automobile. Lending institutions enter into loan agreements to make a profit. The profit that the lender makes is derived from finance charges or interest that the borrower pays to the lender in exchange for the right to use the loaned money to make a purchase.

Thus, from the borrower's point of view, the interest paid to the lender is a loss that the borrower must incur in order to make a non-cash purchase. This interest can be a heavy burden on the borrower, especially on long-term loans, such as 20–30 year mortgages. Therefore, borrowers would benefit from an extra source of income to aid in paying the interest on the loan.

Of course, the lender desires to loan as much money as possible while maintaining a security interest in the loaned funds. Typically, the amount of money that a lender can loan is limited by the borrower's income. Thus, if the borrower's income were increased, the lender could benefit by being able to loan more money to the borrower.

SUMMARY

The above and other benefits are provided by a financial management data processing system for determining monetary amounts related to a loan from a lender to a borrower. The loan consists of a base loan amount to be used by the borrower, for which the lender charges the borrower an interest amount at a loan interest rate over a loan term. The loan also consists of an investment loan amount to be invested in an investment, where the investment earns a return on the investment at a rate of return. The financial management data processing system includes information input means, first, second, and third processing means, and output means. The information input means are for inputting the base loan amount, the investment loan amount, the loan interest rate, the rate of return on the investment, and the loan term. The first data processing means are for (i) summing the base loan amount and the investment loan amount to produce a principal amount, (ii) determining the interest amount based on the principal amount, the loan interest rate, and the loan term, (iii) amortizing the loan based upon the loan interest rate and the loan term to determine an interest payment amount and a principal payment amount, and (iv) determining a loan payment amount by combining the interest payment amount and principal payment amount. The second data processing means are for determining the return on the investment based on the investment loan amount and the rate of return on the investment. The third data processing means are for applying at least a portion of the return on the investment to reduce at least one of the principal amount and the interest amount. The output means are for displaying results of determinations made by the first, second, and third data processing means.

A preferred embodiment of the invention also includes fourth and fifth data processing means. The fourth data processing means are for (i) creating a loan account that indicates the principal amount and the interest amount, (ii) reducing the principal amount as the principal payment amount is received, and (iii) reducing the interest amount as the interest payment amount is received. The fifth data processing means are for creating an investment account that indicates the investment amount and the return on the investment. The third data processing means of this embodiment is also operable to transfer at least a portion of the return on the investment from the investment account to the loan account to reduce the principal amount, the interest amount, or both.

Thus, a portion of the loan amount is the base loan amount that is used for a purchase, and a portion of the loan is the investment loan amount that is invested. By applying some or all of the return on the investment to reduce the principal or interest amount, the preferred embodiment of the invention can either accelerate the repayment of the loan, reduce the borrower's payments, or both. When the loan amount is repaid, the borrower still has equity in the invested portion. Therefore, the preferred embodiment of the invention can reduce the cost of a loan, as well as provide profit for the borrower over the life of the loan.

In another aspect the invention provides a computer-readable information storage device consisting of executable units. The information storage device includes first, second, and third executable units for implementing a financial management system that determines monetary amounts related to a loan from a lender to a borrower. The first executable unit is for (i) determining a principal amount by summing the base loan amount and the investment loan amount, (ii) amortizing the loan based upon the loan interest rate and the loan term to determine an interest payment amount and a principal payment amount, and (iii) determining a loan payment amount by summing the interest payment amount and the principal payment amount. The second executable unit is for determining the return on the investment based on the investment loan amount and the rate of return on the investment. The third executable unit is for applying at least a portion of the return on the investment to reduce the principal amount, the interest amount, or both.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein:

FIG. 16 is an illustration of a Summary of Transactions screen generated by a preferred embodiment of the invention;

FIG. 17 is an illustration of an Investment Portfolio Summary screen generated by a preferred embodiment of the invention;

FIG. 18 is an illustration of a Customer Comparisons screen generated by a preferred embodiment of the invention;

FIG. 19 is an illustration of a Lender Comparisons screen generated by a preferred embodiment of the invention;

DETAILED DESCRIPTION

Figure 1:
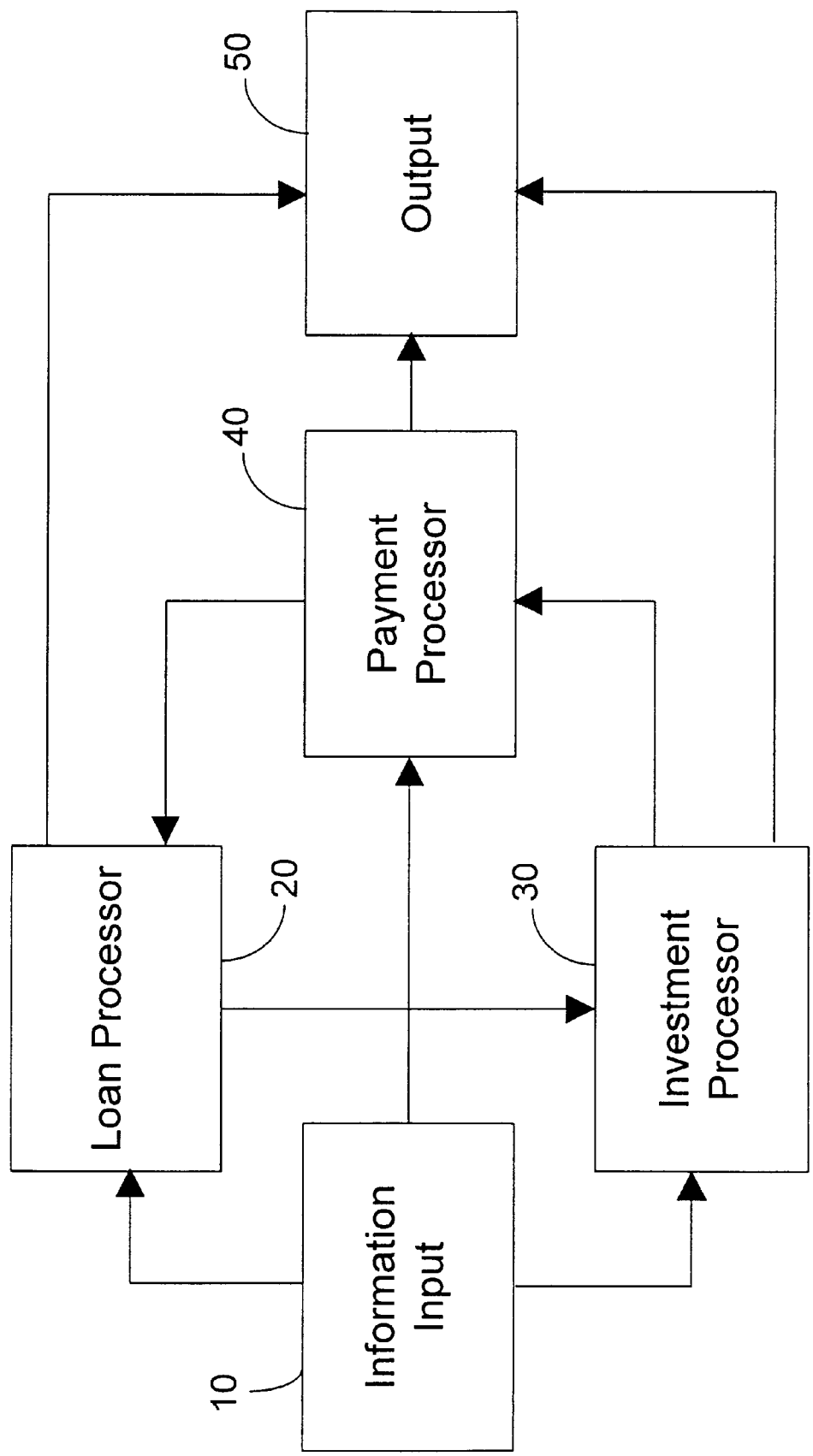
FIG. 1 is a functional block diagram of a data processing system according to the present invention for determining monetary amounts related to a loan.

Shown in FIG. 1 is a data processing system for determining monetary amounts related to a loan. A user of the system may be a potential borrower or lender seeking information to make an informed decision about whether to enter into a loan. Alternatively, the user may be a borrower or a lender who has already entered into a loan agreement, and who wishes to use the invention to keep track of monetary amounts related to the loan.

With reference to FIG. 1, the system includes an information input device 10 used to input information concerning the loan. In the preferred embodiment of the invention, the information input device 10 is a computer keyboard. Alternatively, the information input device 10 is an apparatus that reads information from a readable medium, such as a magnetic disk reader or an optical disk reader. The information input device 10 could also be an interface that connects the data processing system to a network, such as a LAN, WAN, or the Internet. Using the information input device 10, a user enters information relating to the loan, such as a base loan amount, an investment loan amount, a loan interest rate, a loan term, and a rate of return on an investment. Each of these values is discussed in greater detail below. The information input device 10 may also include a computer processor and a display device so that the user may view the information as it is entered to confirm the correctness of the data entry.

Using the information input device 10, the user first enters the base loan amount. The base loan amount is a monetary amount that a borrower, or customer, is borrowing from a lender to apply toward a purchase. Typically, the borrower applies the base loan amount toward a large purchase, such as of a house, automobile, or college education. For example, the base loan amount may be $100,000. The user also uses the information input device 10 to enter the loan interest rate which the lender will charge the borrower to borrow the base loan amount, and the loan term, which is how long the borrower will take to repay the loan. For example, the loan interest rate may be 8.0%, and the loan term may be 30 years.

The user also enters the investment loan amount using the information input device 10. The investment loan amount is a monetary amount that the borrower is borrowing from the lender to invest in an investment. Typical investments in which the investment loan amount may be invested include stocks, certificates of deposit (CDs), bonds, mutual funds, money market funds, or any combination of these investments. For example, the borrower may borrow an investment loan amount of 20% of the base loan amount of $100,000, or $20,000.

Preferably, the rate of return on the investment is expressed as a percentage that the investment earns on an annual basis. The rate of return may be an expected or estimated value to be earned in the future, or it may be an actual value that the investment has earned. For example, the annual rate of return on an investment, such as a mutual fund, may be 15%.

With continued reference to FIG. 1, the information input device 10 routes the base loan amount, the investment loan amount, the loan interest rate, and the loan term to a loan processor 20. In the preferred embodiment of the invention, the loan processor 20 is a computer microprocessor that carries out a series of instructions to determine various monetary amounts related to the loan. The loan processor 20 receives the base loan amount and the investment loan amount from the information input device 10, and sums these values to determine a principal amount. Thus, the principal amount is the total amount of the loan. Carrying forward values from the previous examples, the loan processor 20 determines a principal amount of $120,000 ($100,000+$20,000).

Based on the loan interest rate, the principal amount, and the loan term, the loan processor 20 determines the interest amount. The interest amount is the total finance charge that the lender charges the borrower over the loan term. For example, the interest amount on the $120,000 principal amount at the interest rate of 8% over the loan period of 30 years is approximately $196,984.

Using the loan interest rate, the principal amount, and the loan term as inputs, the loan processor 20 amortizes the loan to determine an interest payment amount and a principal payment amount that is due at periodic payment intervals over the loan term. The interest payment amount is a portion of a loan payment from the borrower to the lender which is applied to pay off the interest amount. The portion of the interest amount that is still owed to the lender as payments are received is the interest balance. The principal payment amount is a portion of the loan payment which is applied to payoff the principal amount. The portion of the principal amount that is still owed to the lender as payments are received is the principal balance. The loan processor 20 combines the interest payment amount and the principal payment amount to determine a loan payment amount. Continuing with the figures from the previous example, the loan processor 20 determines that the first monthly interest payment is $800 and the first monthly principal payment is $80.52.

With reference again to FIG. 1, the information input device 10 routes the investment loan amount and the rate of return on the investment to an investment processor 30. In the preferred embodiment of the invention, the investment processor 30 is a computer microprocessor that carries out a series of instructions to determine various monetary amounts related to the investment, and may be the same microprocessor as the loan processor 20. The investment processor 30 receives the investment loan amount and the rate of return on the investment from the information input device 10, and determines the return on the investment based thereon. For example, for an investment of $20,000 and an annual rate of return on the investment of 15%, investment processor 30 determines the annual return on the investment to be $3,000($20,000×0.15), or $250 on a monthly basis.

Also shown in FIG. 1 is a payment processor 40, which is preferably a computer microprocessor that carries out a series of instructions to determine various monetary amounts related to the loan payments. In a preferred embodiment of the invention, the payment processor 40 is implemented in the same microprocessor as the loan processor 20 and investment processor 30. Based on information supplied by the user by way of the information input 10, the payment processor 40 applies some, or all, of the return on the investment to reduce the owed principal balance or interest balance or both. For example, the user may indicate by way of the information input device 10 that all of the return on investment should be applied to payoff the interest amount. In this situation, the payment processor 40 receives the amount of the return on the investment from the investment processor 30, and transfers that amount to the loan processor 20 to be subtracted from the interest amount. Continuing with the previously-developed example, the payment processor 40 transfers the $250 return on the investment to the loan processor 20 to be applied to the interest payment amount of $800 that is due in the first payment. Thus, the payment processor 40 reduces the borrower's first interest payment amount to $550, resulting in a first monthly loan payment of $630.52 instead of $880.52.

In the preferred embodiment, the output 50 shown in FIG. 1 comprises a display device, such as a CRT or LCD display screen, and an associated video card and software driver. The output 50 receives information from the loan processor 20, the investment processor 30, and the payment processor 40 indicating the results of determinations made by these processing devices. The output 50 displays these results in the form of tables or charts that the user may utilize in making financial decisions. Alternatively, the output 50 comprises a printer device, such as a laser printer or inkjet printer.

Thus, the embodiment of the invention as described above performs useful calculations for the user according to the user's input information, and provides the user with beneficial financial and investment information. A more detailed description of the operation of this embodiment of the invention is provided below, along with examples of the information that is displayed to the user.

Figure 2:
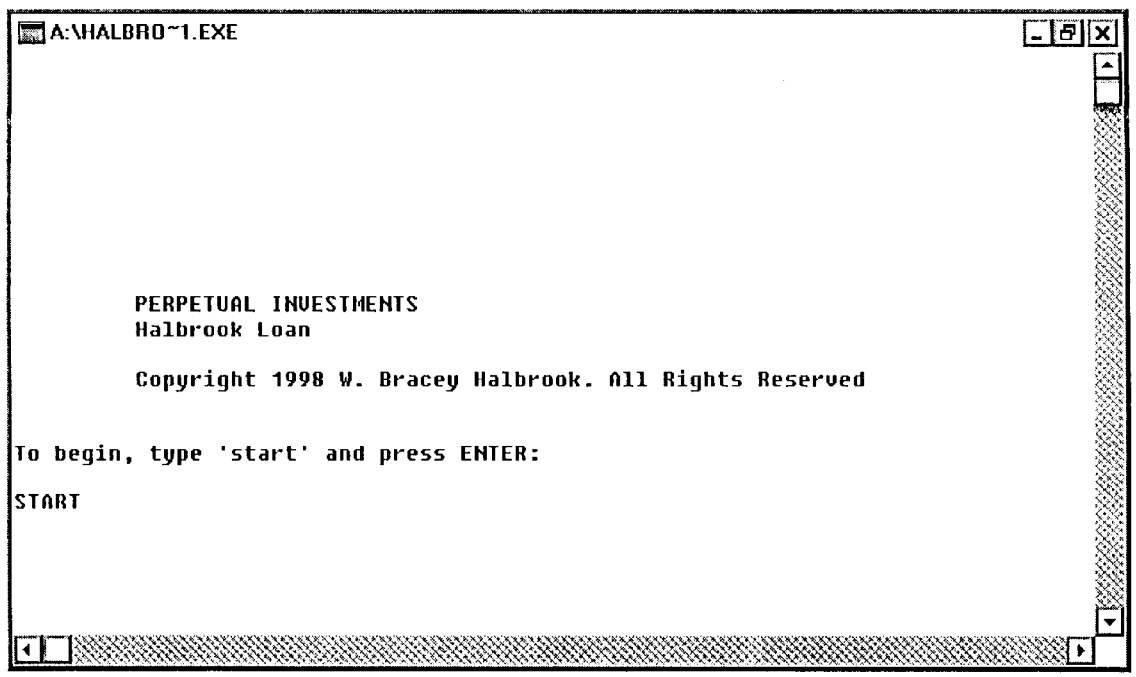
FIG. 2 is an illustration of a "start" display screen generated by a preferred embodiment of the invention.

Shown in FIG. 2 is the first "screen" that a user sees on the display of the output 50 when the preferred embodiment of the invention is started. As FIG. 2 indicates, to begin using the invention, the user types in the word "START" on the keyboard of the information input 10 and presses the ENTER key. When the user does so, the screen of FIG. 3 is displayed.

Figure 3:
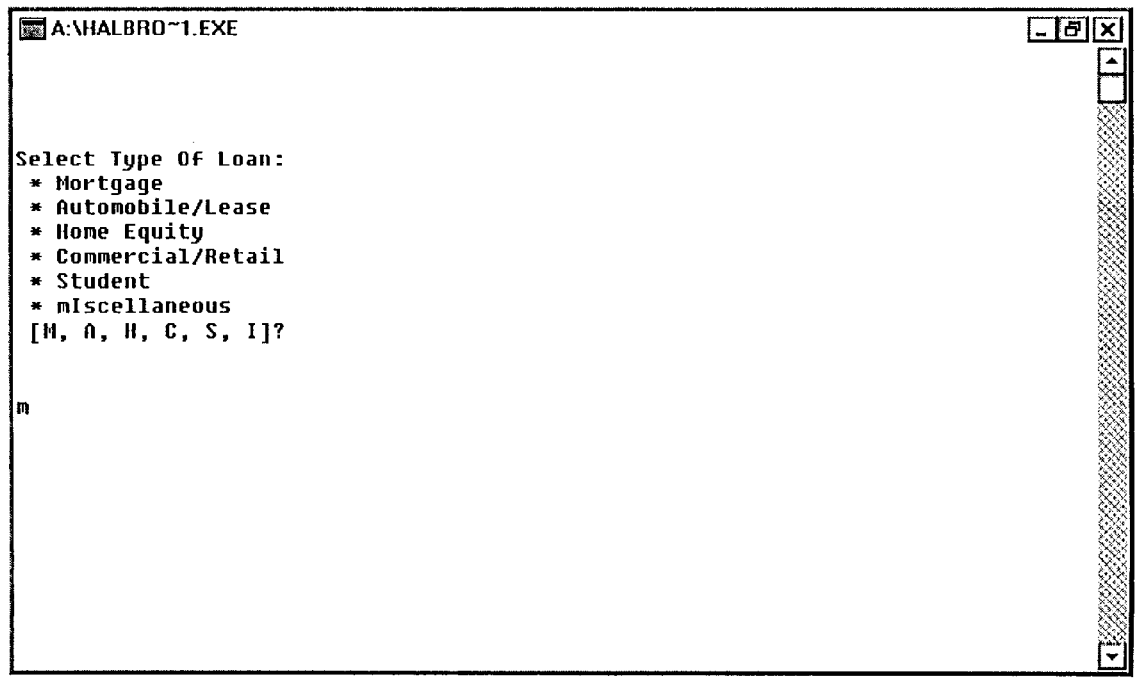
FIG. 3 is an illustration of a loan-type selection screen generated by a preferred embodiment of the invention.

The screen of FIG. 3 indicates the types of loans that the preferred embodiment of the invention may operate on. For purposes of this example, it will be assumed that the user types "m" for a mortgage loan. When the user presses the ENTER key, the screen of FIG. 4 is displayed.

Figure 4:
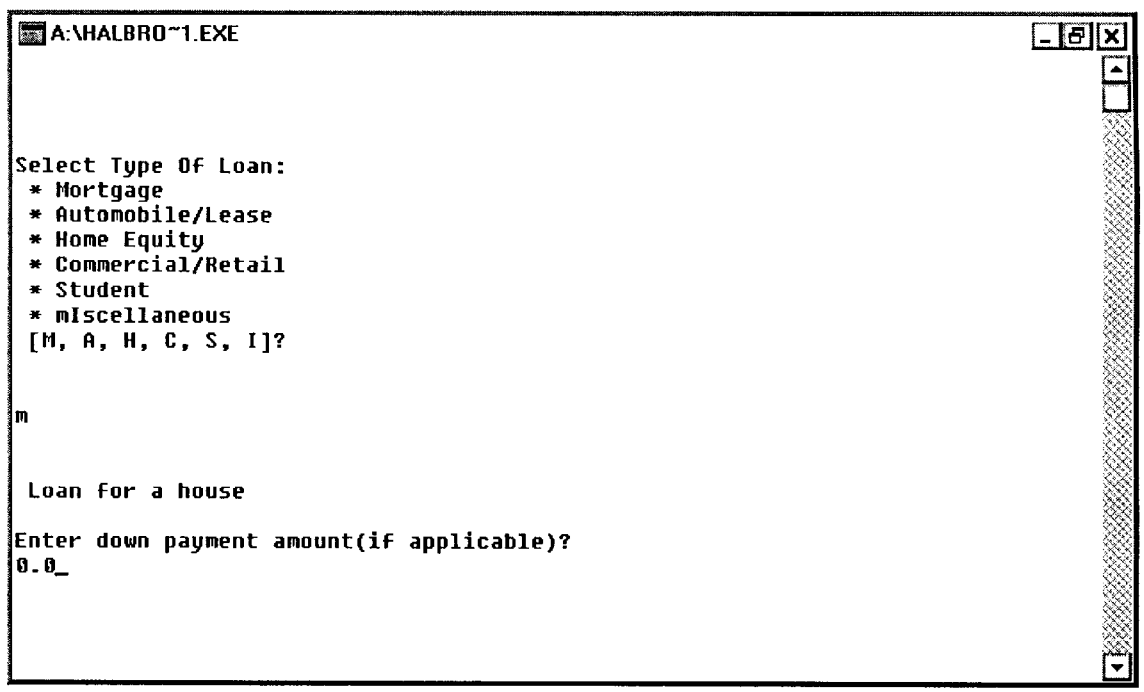
FIG. 4 is an illustration of a down payment entry screen generated by a preferred embodiment of the invention.

As indicated by FIG. 4, the user may specify a down payment for the mortgage loan. For purposes of this example, it will be assumed that the down payment amount is $0. When the user presses the ENTER key, the screen of FIG. 5 is displayed.

Figure 5:
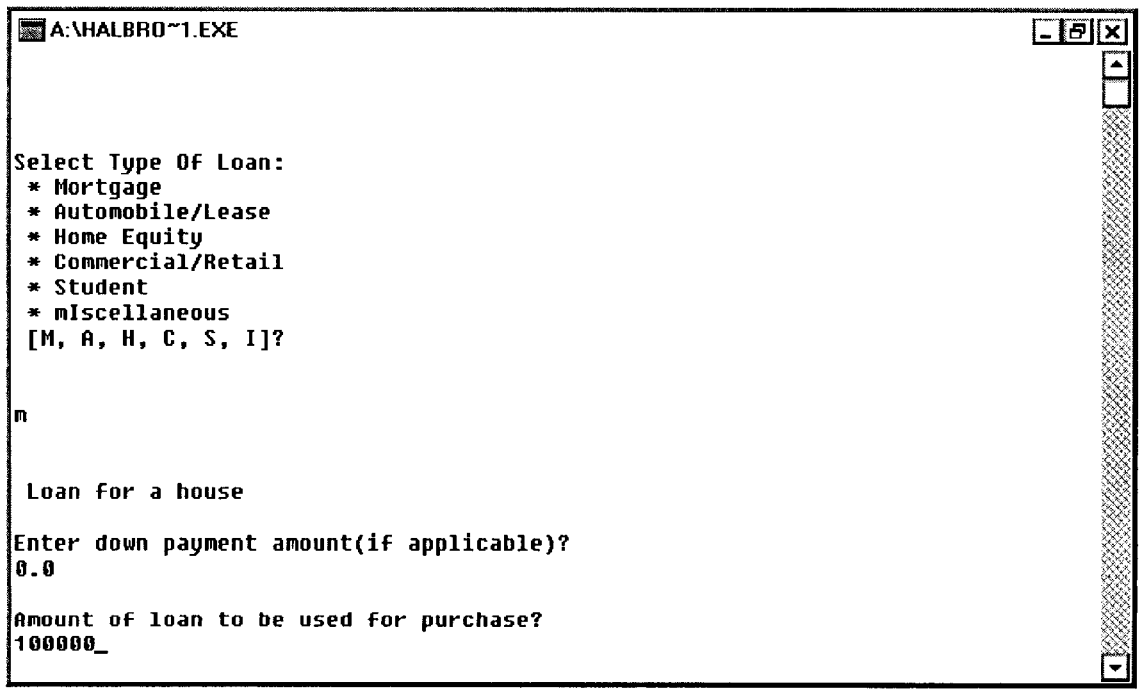
FIG. 5 is an illustration of a base loan amount entry screen generated by a preferred embodiment of the invention.

As shown in FIG. 5, the user next enters the amount of the loan to be used for the purchase (base loan amount). To continue with the previous example, it will be assumed that the user enters $100,000.

Figure 6:
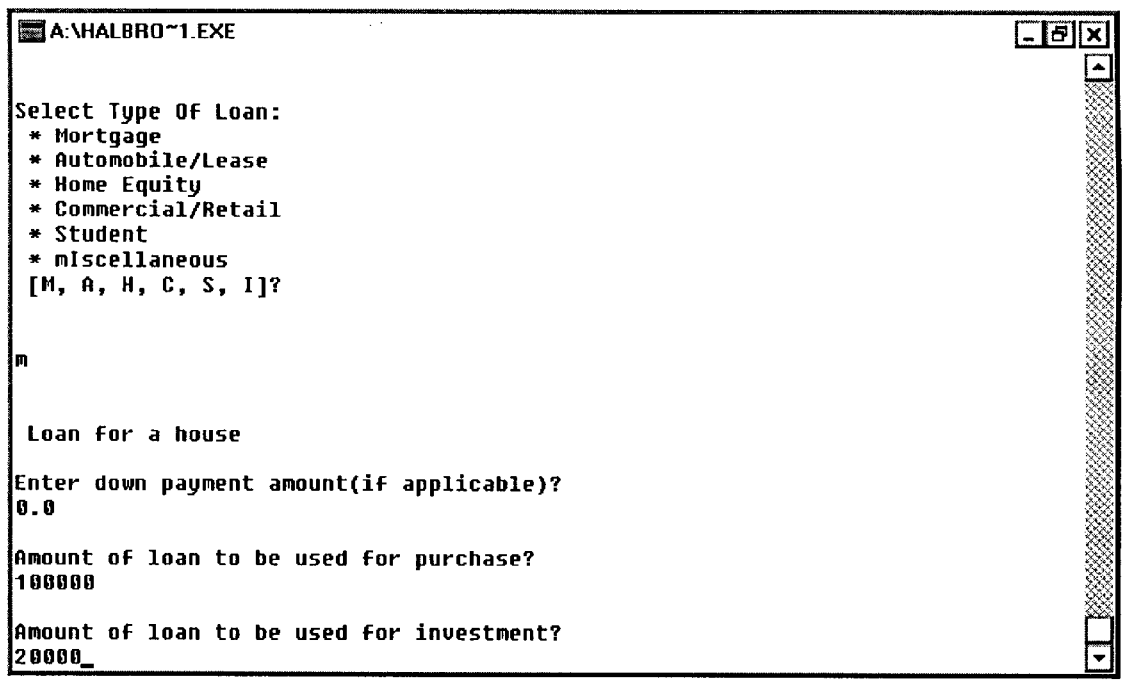
FIG. 6 is an illustration of an investment loan amount entry screen generated by a preferred embodiment of the invention.

FIG. 6 shows the appearance of the next screen where the user enters the amount of the loan to be used for investment purposes (investment loan amount), such as $20,000.

Figure 7:
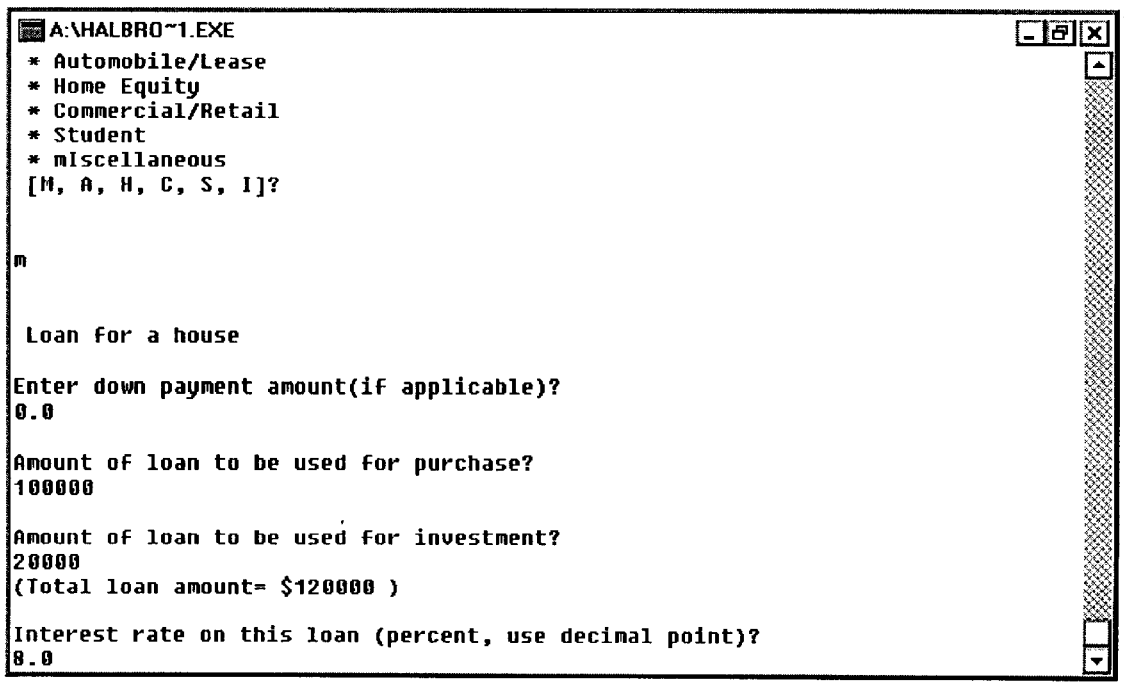
FIG. 7 is an illustration of a loan interest rate entry screen generated by a preferred embodiment of the invention.

From the screen shown at FIG. 7, the user enters the loan interest rate to be paid on the loan, such as 8.0%.

Figure 8:
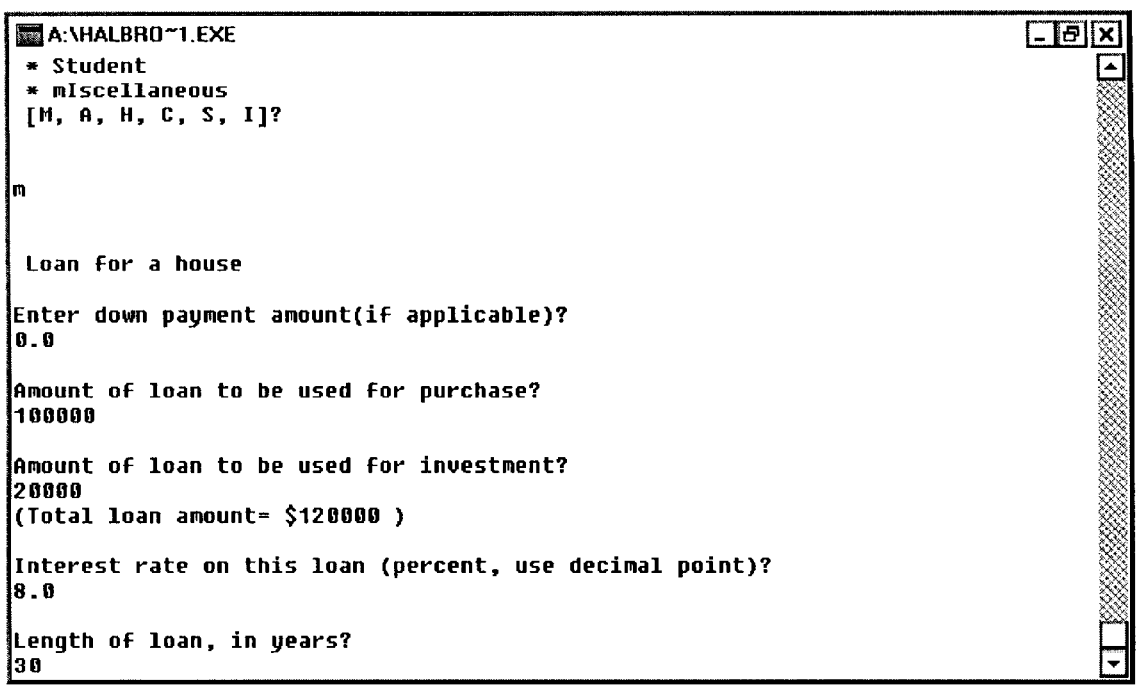
FIG. 8 is an illustration of a loan term entry screen generated by a preferred embodiment of the invention.
Figure 9:
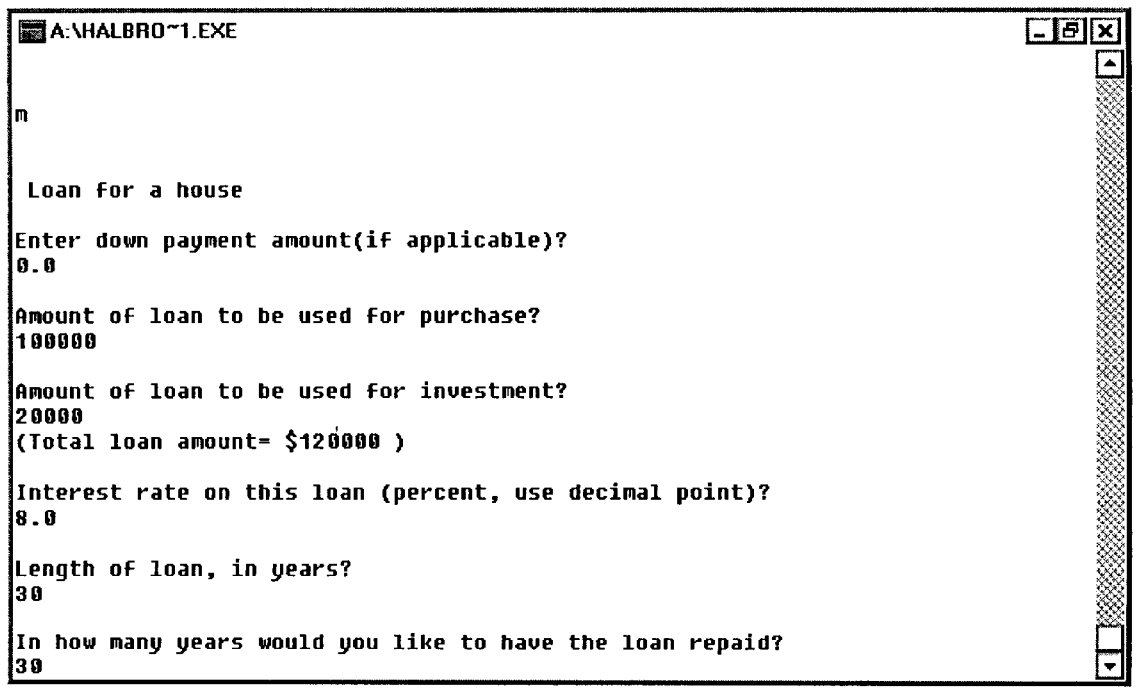
FIG. 9 is an illustration of a repayment time entry screen generated by a preferred embodiment of the invention.
Figure 10:
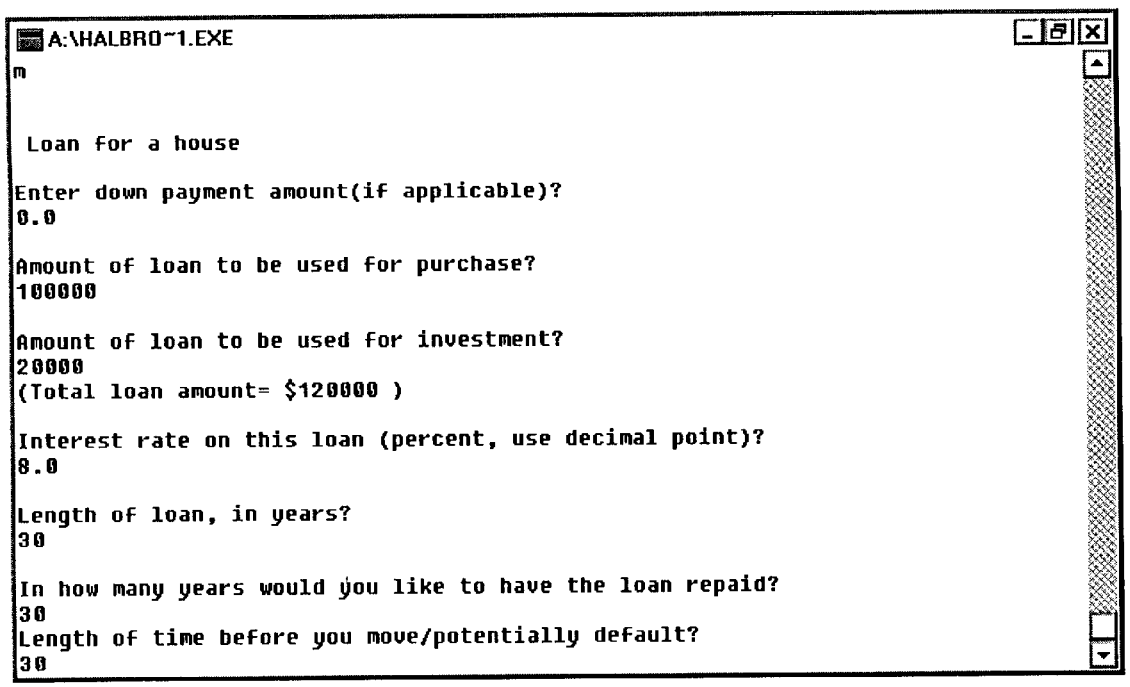
FIG. 10 is an illustration of a move/default time entry screen generated by a preferred embodiment of the invention.

FIGS. 8, 9, and 10 represent the screens for user entry of the length of the loan (30 years), the number of years in which the loan will be repaid, and the length of time before the borrower moves or potentially defaults on the loan. For this example, a period of 30 years is assumed for each of these times.

Figure 11:
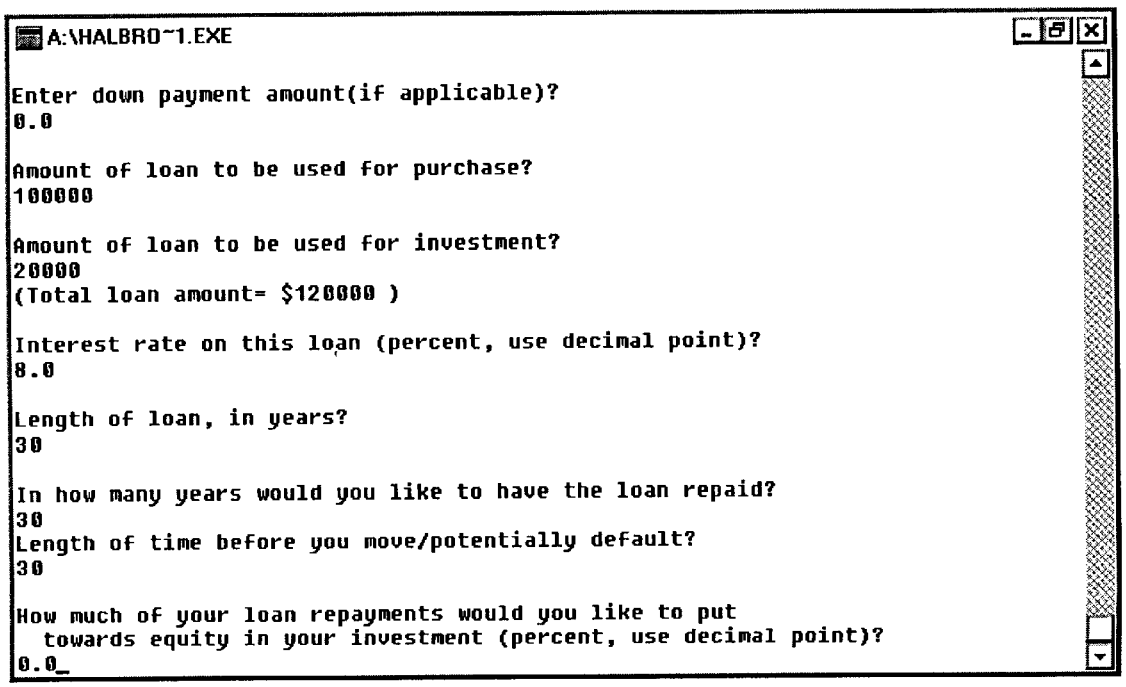
FIG. 11 is an illustration of a payment-to-equity designation entry screen generated by a preferred embodiment of the invention.
Figure 12:
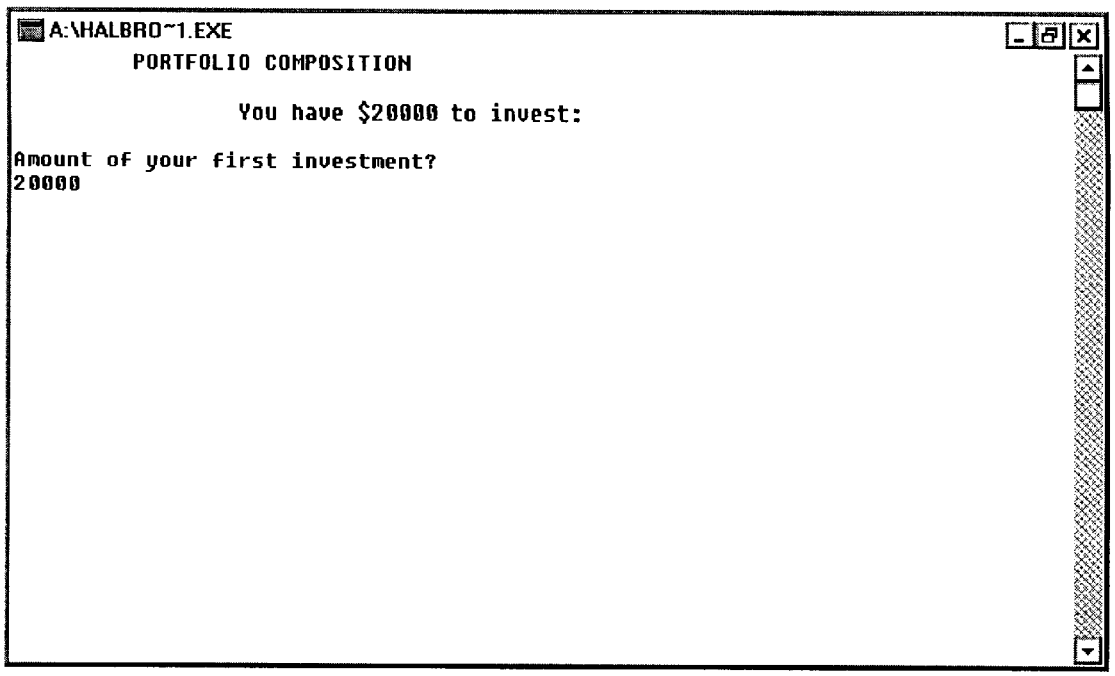
FIG. 12 is an illustration of a Portfolio Composition screen for entering an investment amount as generated by a preferred embodiment of the invention.
Figure 13:
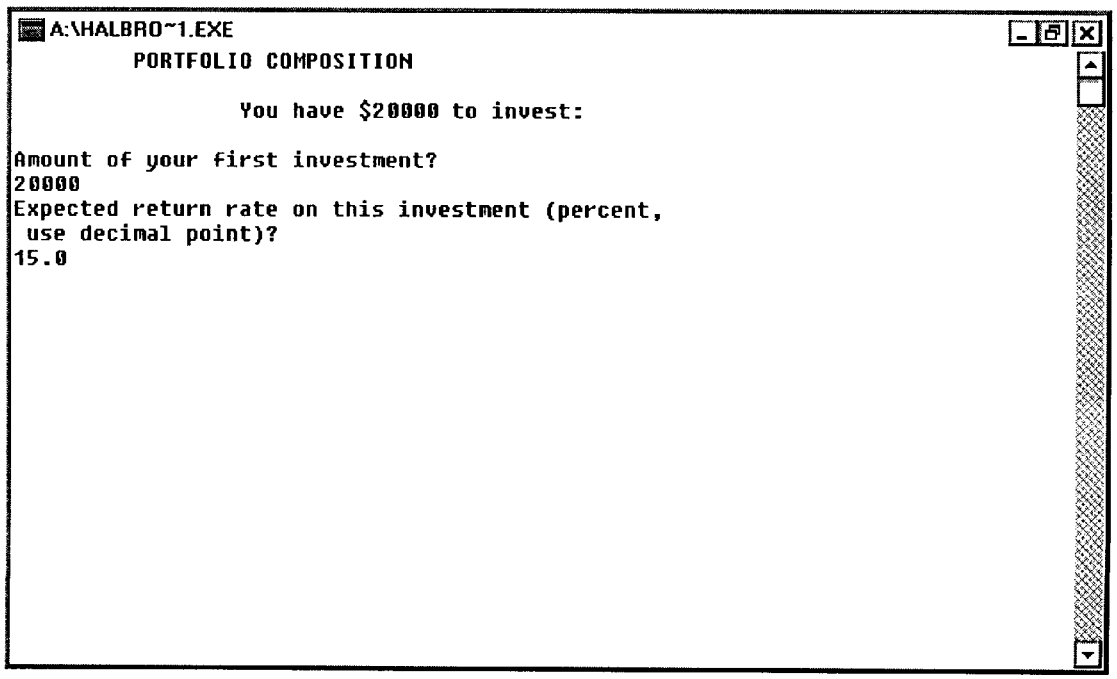
FIG. 13 is an illustration of the Portfolio Composition screen for entering an expected rate of return on the investment.
Figure 14:
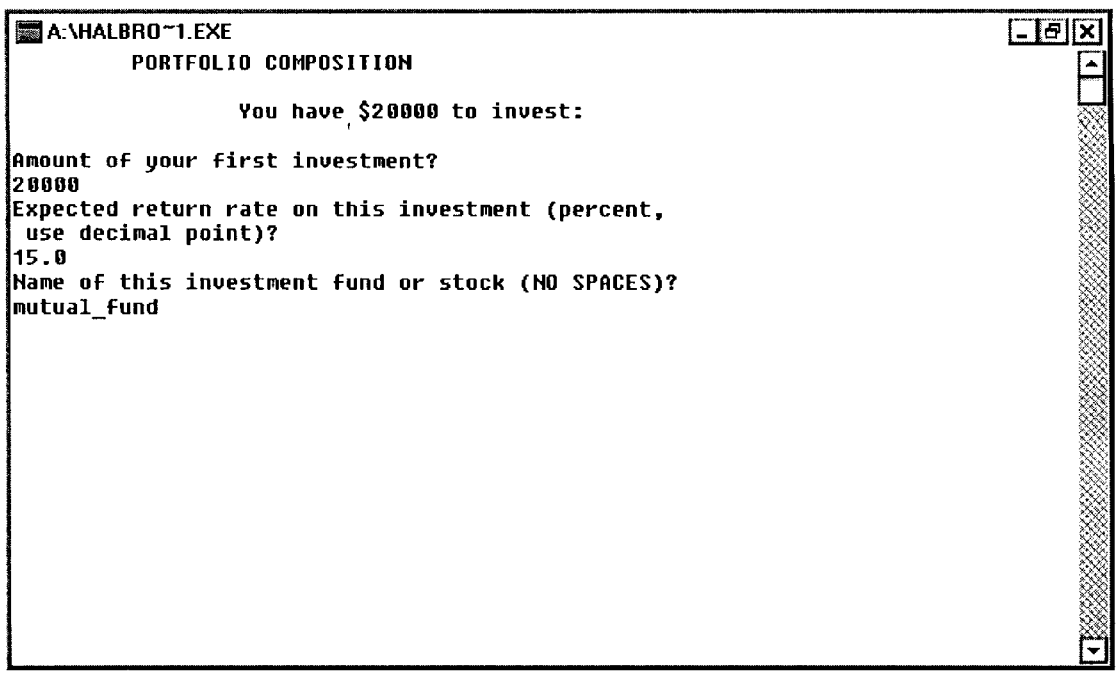
FIG. 14 is an illustration of the Portfolio Composition screen for entering a name of the investment.
Figure 15:
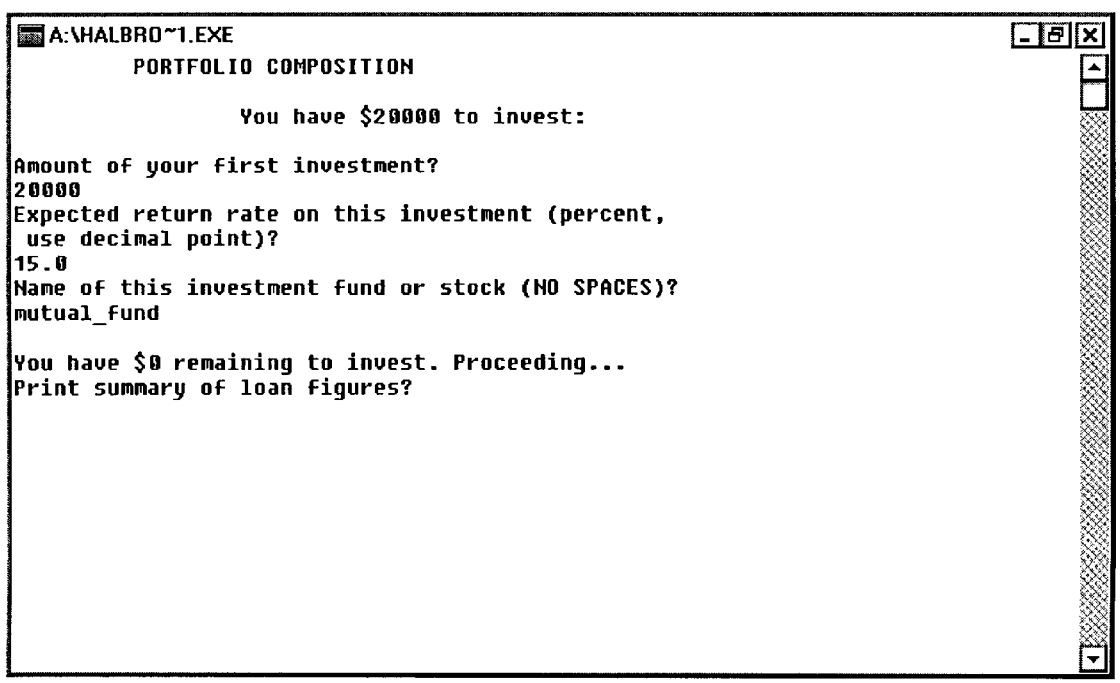
FIG. 15 is another illustration of a Portfolio Composition screen generated by a preferred embodiment of the invention.

As shown in FIG. 11, the preferred embodiment of the invention gives the user the option of applying a percentage of the loan payments toward building equity in the investment. To simplify this example, it will be assumed that this percentage is zero.

FIGS. 12–15 illustrate progressive versions of the "Portfolio Composition" screen which is used to define the distribution of the borrower's investment portfolio. For purposes of this example, it will be assumed that there is a single investment of $20,000 in a mutual fund, with an expected rate of return on the investment of 15%. Alternatively, the investment loan amount may be split into multiple investments with multiple rates of return. Thus, if the amount of the first investment entered in the Portfolio Composition screen is less than the investment loan amount, the user is asked to enter the amount of a second investment, and so on. This continues until the total amount invested equals the investment loan amount.

If the user chooses to have the invention display a summary of the loan figures, the output 50 displays the screen of FIG. 16. Shown in FIG. 16 are two columns of figures generated by the loan processor 20 that compare a "standard" loan (without investment of a portion of the loan) to a loan in which a portion is applied to a purchase and a portion is applied to an investment. The later loan is hereinafter referred to as a "Halbrook" (TM) loan. As FIG. 16 indicates, the monthly payment amount on a standard $100,000 loan at 8.0% over 30 years is $733.76, whereas the monthly payment on the $120,000 Halbrook loan is $880.52. Although the payments on the Halbrook loan are larger than the payments on the standard loan by $146.75, the earnings on the investment will more than offset this difference, as the example will illustrate.

The screen of FIG. 17 summarizes the investment portfolio. As indicated in the last column of FIG. 17, the investment processor 30 determines that the estimated value of the $20,000 investment with compounding interest at a 15% rate over a 30 year period will be about $1,324,235.

At this point, the preferred embodiment of the invention gives the user an option of viewing an amortization schedule for a standard $100,000 loan at 8.0% interest over a 30 year period. The purpose of generating the amortization schedule for the standard loan is for comparison to a similar schedule for the Halbrook loan. If the user chooses this option, a schedule such as that illustrated in Table I is displayed on the output 50. In the interest of conciseness, Table I shows only the results of every sixth monthly payment.

The preferred embodiment of the invention next presents the user with the option of viewing an amortization schedule for a Halbrook $120,000 loan at 8.0% interest over a 30 year period, where $20,000 of the loan is invested in a mutual fund earning 15% annually. If the user chooses this option, a schedule such as that illustrated in Table II is displayed on the output 50. Similar to Table I, Table II shows the results of every sixth monthly payment.

TABLE I

| Month | Beginning Principal Balance | Interest Payment | Principal Payment | Ending Principal Balance | TOTAL Interest Paid | TOTAL Principal Paid |
|---|---|---|---|---|---|---|
| 1 | $1000000.00 | $666.67 | $67.10 | $99932.90 | $666.67 | $67.10 |
| 6 | $99660.01 | $664.40 | $69.36 | $99590.64 | $3993.23 | $409.36 |
| 12 | $99236.82 | $661.58 | $72.19 | $99164.64 | $7969.81 | $835.36 |
| 18 | $98796.42 | $658.64 | $75.12 | $98721.30 | $11929.06 | $1278.70 |
| 24 | $98338.11 | $655.59 | $78.18 | $98259.94 | $15870.29 | $1740.06 |
| 30 | $97861.16 | $652.41 | $81.36 | $97779.81 | $19792.74 | $2220.19 |
| 36 | $97364.81 | $649.10 | $84.67 | $97280.15 | $23695.67 | $2719.85 |
| 42 | $96848.28 | $645.66 | $88.11 | $96760.17 | $27578.28 | $3239.83 |
| 48 | $96310.73 | $642.07 | $91.69 | $96219.04 | $31439.74 | $3780.96 |
| 54 | $95751.32 | $638.34 | $95.42 | $95655.90 | $35279.19 | $4344.10 |
| 60 | $95169.16 | $634.46 | $99.30 | $95069.86 | $39095.73 | $4930.14 |
| 66 | $94563.32 | $630.42 | $103.34 | $94459.98 | $42888.44 | $5540.02 |
| 72 | $93932.84 | $626.22 | $107.55 | $93825.29 | $46656.34 | $6174.71 |
| 78 | $93276.71 | $621.84 | $111.92 | $93164.79 | $50398.43 | $6835.21 |
| 84 | $92593.90 | $617.29 | $116.47 | $92477.43 | $54113.66 | $7522.57 |
| 90 | $91883.32 | $612.56 | $121.21 | $91762.11 | $57800.92 | $8237.89 |
| 96 | $91143.84 | $607.63 | $126.14 | $91017.70 | $61459.10 | $8982.30 |
| 102 | $90374.28 | $602.50 | $131.27 | $90243.01 | $65086.99 | $9756.99 |
| 108 | $89573.42 | $597.16 | $136.61 | $89436.81 | $68683.38 | $10563.19 |
| 114 | $88739.98 | $591.60 | $142.16 | $88597.82 | $72246.98 | $11402.18 |
| 120 | $87872.65 | $585.82 | $147.95 | $87724.70 | $75776.45 | $12275.30 |
| 126 | $86970.04 | $579.80 | $153.96 | $86816.08 | $79270.41 | $13183.92 |
| 132 | $86030.72 | $573.54 | $160.23 | $85870.50 | $82727.4Z | $14129.50 |
| 138 | $85053.20 | $567.02 | $166.74 | $84886.46 | $86145.97 | $15113.54 |
| 144 | $84035.92 | $560.24 | $173.53 | $83862.39 | $89524.49 | $16137.61 |
| 150 | $82977.26 | $553.18 | $180.58 | $82796.67 | $92861.36 | $17203.33 |
| 156 | $81875.54 | $545.84 | $187.93 | $81687.61 | $96154.89 | $18312.39 |
| 162 | $80729.01 | $538.19 | $195.57 | $80533.44 | $99403.30 | $19466.56 |
| 168 | $79535.86 | $530.24 | $203.53 | $79332.33 | $102604.78 | $20667.67 |
| 174 | $78294.17 | $521.96 | $211.80 | $78082.36 | $105757.40 | $21917.64 |
| 180 | $77001.98 | $513.35 | $220.42 | $76781.56 | $108859.18 | $23218.44 |
| 186 | $75657.23 | $504.38 | $229.38 | $75427.85 | $111908.06 | $24572.15 |
| 192 | $74257.79 | $495.05 | $238.71 | $74019.08 | $114901.87 | $25980.92 |
| 198 | $72801.43 | $485.34 | $248.42 | $72553.01 | $117838.39 | $27446.99 |
| 204 | $71285.83 | $475.24 | $258.53 | $71027.31 | $120715.28 | $28972.69 |
| 210 | $69708.60 | $464.72 | $269.04 | $69439.56 | $123530.12 | $30560.44 |
| 216 | $68067.21 | $453.78 | $279.98 | $67787.23 | $126280.37 | $32212.77 |
| 222 | $66359.06 | $442.39 | $291.37 | $66067.69 | $128963.43 | $33932.31 |
| 228 | $64581.44 | $430.54 | $303.22 | $64278.22 | $131576.54 | $35721.78 |
| 234 | $62731.52 | $418.21 | $315.55 | $62415.96 | $134116.87 | $37584.04 |
| 240 | $60806.35 | $405.38 | $328.39 | $60477.96 | $136581.46 | $39522.04 |
| 246 | $58802.89 | $392.02 | $341.75 | $58461.14 | $138967.23 | $41538.86 |
| 252 | $56717.93 | $378.12 | $355.65 | $56362.29 | $141270.96 | $43637.71 |
| 258 | $54548.18 | $363.65 | $370.11 | $54178.07 | $143489.33 | $45821.93 |
| 264 | $52290.18 | $348.60 | $385.16 | $51905.02 | $145618.86 | $48094.98 |
| 270 | $49940.34 | $332.94 | $400.83 | $49539.51 | $147655.95 | $50460.49 |
| 276 | $47494.92 | $316.63 | $417.13 | $47077.79 | $149596.82 | $52922.21 |
| 282 | $44950.05 | $299.67 | $434.10 | $44515.95 | $151437.56 | $55484.05 |
| 288 | $42301.67 | $282.01 | $451.75 | $41849.91 | $153174.11 | $58150.09 |
| 294 | $39545.57 | $263.64 | $470.13 | $39075.44 | $154802.22 | $60924.56 |
| 300 | $36677.37 | $244.52 | $489.25 | $36188.12 | $156317.49 | $63811.88 |
| 306 | $33692.51 | $224.62 | $509.15 | $33183.37 | $157715.33 | $66816.63 |
| 312 | $30586.26 | $203.91 | $529.86 | $30056.40 | $158990.95 | $69943.60 |
| 318 | $27353.66 | $182.36 | $551.41 | $26802.25 | $160139.39 | $73197.75 |
| 324 | $23989.59 | $159.93 | $573.83 | $23415.75 | $161155.47 | $76584.25 |
| 330 | $20488.69 | $136.59 | $597.17 | $19891.51 | $162033.82 | $80108.49 |
| 336 | $16845.40 | $112.30 | $621.46 | $16223.93 | $162768.83 | $83776.07 |
| 342 | $13053.92 | $87.03 | $646.74 | $12407.18 | $163354.67 | $87592.82 |
| 348 | $9108.24 | $60.72 | $673.04 | $8435.20 | $163785.27 | $91564.80 |
| 354 | $5002.08 | $33.35 | $700.42 | $4301.66 | $164054.32 | $95698.34 |
| 360 | $728.91 | $4.86 | $728.91 | $0.00 | $164155.25 | $100000.00 |

TABLE II

| Month | Beginning Principal Balance | Interest Payment | Equity in Investment (paid in) | Principal Payment | TOTAL Interest Paid | TOTAL Equity in Investment | TOTAL Principal Paid |
|---|---|---|---|---|---|---|---|
| 1 | $120000.00 | $800.00 | $0.00 | $80.52 | $800.00 | $0.00 | $80.52 |
| 6 | $119592.01 | $797.28 | $0.00 | $83.24 | $4791.88 | $0.00 | $491.23 |
| 12 | $119084.19 | $793.89 | $0.00 | $86.62 | $9563.77 | $0.00 | $1002.44 |
| 18 | $118555.71 | $790.37 | $0.00 | $90.15 | $14314.88 | $0.00 | $1534.44 |
| 24 | $118005.74 | $786.70 | $0.00 | $93.81 | $19044.34 | $0.00 | $2088.08 |
| 30 | $117433.40 | $782.89 | $0.00 | $97.63 | $23751.29 | $0.00 | $2664.23 |
| 36 | $116837.78 | $778.92 | $0.00 | $101.60 | $28434.81 | $0.00 | $3263.82 |
| 42 | $116217.93 | $774.79 | $0.00 | $105.73 | $33093.94 | $0.00 | $3887.80 |
| 48 | $115572.88 | $770.49 | $0.oo | $110.03 | $37727.69 | $0.00 | $4537.15 |
| 54 | $114901.59 | $766.01 | $0.00 | $114.51 | $42335.02 | $0.00 | $5212.92 |
| 60 | $114202.99 | $761.35 | $0.00 | $119.16 | $46914.88 | $0.00 | $5916.17 |
| 66 | $113475.98 | $756.51 | $0.00 | $124.01 | $51466.13 | $0.00 | $6648.03 |
| 72 | $112719.41 | $751.46 | $0.00 | $129.05 | $55987.61 | $0.00 | $7409.65 |
| 78 | $111932.06 | $746.21 | $0.00 | $134.30 | $60478.12 | $0.00 | $8202.25 |
| 84 | $111112.68 | $740.75 | $0.00 | $139.77 | $64936.39 | $0.00 | $9027.08 |
| 90 | $110259.99 | $735.07 | $0.00 | $145.45 | $69361.11 | $0.00 | $9885.47 |
| 96 | $109372.60 | $729.15 | $0.00 | $151.37 | $73750.92 | $0.00 | $10778.76 |
| 102 | $108449.13 | $722.99 | $0.00 | $157.52 | $78104.39 | $0.00 | $11708.39 |
| 108 | $107488.10 | $716.59 | $0.00 | $163.93 | $82420.06 | $0.00 | $12675.83 |
| 114 | $106487.98 | $709.92 | $0.00 | $170.60 | $86696.37 | $0.00 | $13682.62 |
| 120 | $105447.18 | $702.98 | $0.00 | $177.54 | $90931.74 | $0.00 | $14730.36 |
| 126 | $104364.05 | $695.76 | $0.00 | $184.76 | $95124.50 | $0.00 | $15820.71 |
| 132 | $103236.87 | $688.25 | $0.00 | $192.27 | $99272.90 | $0.00 | $16955.40 |
| 138 | $102063.84 | $680.43 | $0.00 | $200.09 | $103375.16 | $0.00 | $18136.25 |
| 144 | $100843.10 | $672.29 | $0.00 | $208.23 | $107429.39 | $0.00 | $19365.13 |
| 150 | $99572.71 | $663.82 | $0.00 | $216.70 | $111433.63 | $0.00 | $20643.99 |
| 156 | $98250.65 | $655.00 | $0.00 | $225.51 | $115385.86 | $0.00 | $21974.86 |
| 162 | $96874.82 | $645.83 | $0.00 | $234.69 | $119283.96 | $0.00 | $23359.87 |
| 168 | $95443.03 | $636.29 | $0.00 | $244.23 | $123125.73 | $0.00 | $24801.20 |
| 174 | $93953.00 | $626.35 | $0.00 | $254.16 | $126908.88 | $0.00 | $26301.16 |
| 180 | $92402.37 | $616.02 | $0.00 | $264.50 | $130631.02 | $0.00 | $27862.13 |
| 186 | $90788.68 | $605.26 | $0.00 | $275.26 | $134289.67 | $0.00 | $29486.58 |
| 192 | $89109.35 | $594.06 | $0.00 | $286.46 | $137882.25 | $0.00 | $31177.11 |
| 198 | $87361.71 | $582.41 | $0.00 | $298.11 | $141406.07 | $0.00 | $32936.39 |
| 204 | $85543.00 | $570.29 | $0.00 | $310.23 | $144858.34 | $0.00 | $34767.23 |
| 210 | $83650.32 | $557.67 | $0.00 | $322.85 | $148236.14 | $0.00 | $36672.53 |
| 216 | $81680.65 | $544.54 | $0.00 | $335.98 | $151536.45 | $0.00 | $38655.33 |
| 222 | $79630.87 | $530.87 | $0.00 | $349.64 | $154756.11 | $0.00 | $40718.77 |
| 228 | $77497.73 | $516.65 | $0.00 | $363.87 | $157891.85 | $0.00 | $42866.14 |
| 234 | $75277.82 | $501.85 | $0.00 | $378.67 | $160940.25 | $0.00 | $45100.85 |
| 240 | $72967.62 | $486.45 | $0.00 | $394.07 | $163897.75 | $0.00 | $47426.44 |
| 246 | $70563.46 | $470.42 | $0.00 | $410.09 | $166760.67 | $0.00 | $49846.63 |
| 252 | $68061.52 | $453.74 | $0.00 | $426.77 | $169525.15 | $0.00 | $52365.25 |
| 258 | $65457.82 | $436.39 | $0.00 | $444.13 | $172187.20 | $0.00 | $54986.31 |
| 264 | $62748.22 | $418.32 | $0.00 | $462.20 | $174742.64 | $0.00 | $57713.98 |
| 270 | $59928.41 | $399.52 | $0.00 | $480.99 | $177187.13 | $0.00 | $60552.59 |
| 276 | $56993.91 | $379.96 | $0.00 | $500.56 | $179516.18 | $0.00 | $63506.65 |
| 282 | $53940.06 | $359.60 | $0.00 | $520.92 | $181725.07 | $0.00 | $66580.86 |
| 288 | $50762.00 | $338.41 | $0.00 | $542.10 | $183808.93 | $0.00 | $69780.11 |
| 294 | $47454.68 | $316.36 | $0.00 | $564.15 | $185762.67 | $0.00 | $73109.47 |
| 300 | $44012.84 | $293.42 | $0.00 | $587.10 | $187580.99 | $0.00 | $76574.26 |
| 306 | $40431.02 | $269.54 | $0.00 | $610.98 | $189258.39 | $0.00 | $80179.96 |
| 312 | $36703.51 | $244.69 | $0.00 | $635.83 | $190789.14 | $0.00 | $83932.32 |
| 318 | $32824.39 | $218.83 | $0.00 | $661.69 | $192167.27 | $0.00 | $87837.30 |
| 324 | $28787.50 | $191.92 | $0.00 | $688.60 | $193386.57 | $0.00 | $91901.10 |
| 330 | $24586.42 | $163.91 | $0.00 | $716.61 | $194440.59 | $0.00 | $96130.18 |
| 336 | $20214.47 | $134.76 | $531.28 | $214.47 | $195322.60 | $531.28 | $100000.00 |
| 342 | $i5664.71 | $104.43 | $776.09 | $0.00 | $196025.60 | $5111.38 | $100000.00 |
| 348 | $10929.89 | $72.87 | $807.65 | $0.00 | $196542.32 | $9877.76 | $100000.00 |
| 354 | $6002.49 | $40.02 | $840.50 | $0.00 | $196865.18 | $14838.01 | $100000.00 |
| 360 | $874.69 | $5.83 | $874.69 | $0.00 | $196986.30 | $20000.00 | $100000.00 |

After viewing the amortization schedules generated by the loan processor 20, the user has the option of viewing a Customer Comparisons screen as shown in FIG. 18. By showing a comparison of the borrower's investment value at the end of the loan term for the Halbrook versus the standard loan, this screen indicates to the user the financial benefit of the Halbrook loan. As shown in FIG. 18, at the end of the loan term, the borrower has repaid $316,986.30 for the Halbrook loan ($120,000 principal+$196,896.30 interest). During the same period, the borrower's $20,000 investment has accrued an investment value of $1,324,235.44. Thus, the profit to the borrower is the difference between the loan payment amount and the investment value, which is:

$1,324,235.44−$316,986.30=$1,127,249.14.

Thus, as FIG. 18 indicates, the borrower has gained $9.39 in profit for every dollar repaid over the term of the loan.

For purposes of comparison, FIG. 18 also shows the amounts related to the standard loan. Although the borrower repays less on the standard loan ($264,155.25), there is no amount invested. Thus, for the standard loan, there is no investment value to offset the interest paid to the lender. As a result, the borrower incurs a total loss of $164,155.25, which is a $2.64 loss for every dollar repaid over the loan term.

The screen illustrated in FIG. 19 shows the advantages of the Halbrook loan to the lender. Because of the larger loan amount, the Halbrook loan of this example provides the lender with a profit of 32.2% above that of the standard loan.

After presenting the customer and lender comparison screens, this preferred embodiment of the invention gives the user the option of viewing yearly customer comparisons. Table III is exemplary of the output generated if the user chooses to do so. For each year of the loan term, the second column of Table III indicates a running total of the loan payment amount for the Halbrook loan ($120,000). The third column indicates a running total of the value of the investment, which is the investment amount ($20,000) plus the return on the investment for the year. The fourth column indicates the running total payment amount for a standard loan (100,000). The fifth column shows the savings that the borrower realizes by acquiring the Halbrook loan instead of the standard loan. The values in the fifth column are determined for each year according to:

Savings=Investment Value−(Halbrook payment−Standard payment).

Thus, over the life of the loan of this example, the borrower attains savings of $1,271,404.39 due to the invested portion of the Halbrook loan.

to year as payments are received. The lender's equity in the third and fourth columns is determined by:

Equity=loan principal+total of interest payments.

The fifth column indicates the difference in the lender's equity between the Halbrook and standard loans.

TABLE IV

| YR | Additional Payment (Cum.) | Equity (Std.) | Equity (Halbrook) | Difference in Equity |
|---|---|---|---|---|
| 1 | $1761.03 | $107969.81 | $132563.77 | $24593.96 |
| 2 | $3522.07 | $115870.29 | $145494.34 | $29624.06 |
| 3 | $5283.10 | $123695.67 | $158852.31 | $35156.63 |
| 4 | $7044.14 | $131439.74 | $172707.81 | $41268.07 |
| 5 | $8805.17 | $139095.73 | $187142.02 | $48046.29 |
| 6 | $10566.21 | $146656.34 | $202248.83 | $55592.48 |
| 7 | $12327.24 | $154113.66 | $218136.78 | $64023.13 |
| 8 | $14088.28 | $161459.10 | $234931.37 | $73472.28 |
| 9 | $15849.31 | $168683.38 | $252777.58 | $84094.20 |
| 10 | $17610.35 | $175776.45 | $271842.90 | $96066.45 |
| 11 | $19371.38 | $182727.42 | $292320.73 | $109593.31 |
| 12 | $21132.42 | $189524.49 | $314434.39 | $124909.90 |
| 13 | $22893.45 | $196154.89 | $338441.62 | $142286.73 |
| 14 | $24654.49 | $202604.78 | $364639.85 | $162035.07 |
| 15 | $26415.52 | $208859.18 | $393372.25 | $184513.07 |
| 16 | $28176.56 | $214901.87 | $425034.67 | $210132.79 |
| 17 | $29937.59 | $220715.28 | $460083.62 | $239368.34 |
| 18 | $31698.63 | $226280.37 | $499045.52 | $272765.15 |

TABLE III

| YR | TOTAL Payment Halbrook | Investment Value | TOTAL Payment Standard | Savings with Halbrook | Equity with Halbrook | Equity with Standard | Equity Difference |
|---|---|---|---|---|---|---|---|
| 1 | 10566.21 | 23000.00 | 8805.17 | 21238.97 | 1002.44 | 835.36 | 167.07 |
| 2 | 21132.42 | 26450.00 | 17610.35 | 22927.93 | 2088.08 | 1740.06 | 348.01 |
| 3 | 31698.63 | 30417.50 | 26415.52 | 25134.40 | 3263.82 | 2719.85 | 543.97 |
| 4 | 42264.84 | 34980.13 | 35220.70 | 27935.99 | 4537.15 | 3780.96 | 756.19 |
| 5 | 52831.05 | 40227.14 | 44025.87 | 31421.97 | 5916.17 | 4930.14 | 986.03 |
| 6 | 63397.26 | 46261.22 | 52831.05 | 35695.01 | 7409.65 | 6174.71 | 1234.94 |
| 7 | 73963.47 | 53200.40 | 61636.22 | 40873.15 | 9027.08 | 7522.57 | 1504.51 |
| 8 | 84529.68 | 61180.46 | 70441.40 | 47092.18 | 10778.76 | 8982.30 | 1796.46 |
| 9 | 95095.89 | 70357.53 | 79246.57 | 54508.21 | 12675.83 | 10563.19 | 2112.64 |
| 10 | 105662.10 | 80911.15 | 88051.75 | 63300.80 | 14730.36 | 12275.30 | 2455.06 |
| 11 | 116228.31 | 93047.83 | 96856.92 | 73676.44 | 16955.40 | 14129.50 | 2825.90 |
| 12 | 126794.52 | 107005.00 | 105662.10 | 85872.58 | 19365.13 | 16137.61 | 3227.52 |
| 13 | 137360.73 | 123055.75 | 114467.27 | 100162.30 | 21974.86 | 18312.39 | 3662.48 |
| 14 | 147926.94 | 141514.12 | 123272.45 | 116859.63 | 24801.20 | 20667.67 | 4133.53 |
| 15 | 158493.15 | 162741.23 | 132077.62 | 136325.71 | 27862.13 | 23218.44 | 4643.69 |
| 16 | 169059.36 | 187152.42 | 140882.80 | 158975.86 | 31177.11 | 25980.92 | 5196.18 |
| 17 | 179625.57 | 215225.28 | 149687.97 | 185287.69 | 34767.23 | 28972.69 | 5794.54 |
| 18 | 190191.78 | 247509.07 | 158493.15 | 215810.44 | 38655.33 | 32212.77 | 6442.55 |
| 19 | 200757.99 | 284635.43 | 167298.32 | 251175.77 | 42866.14 | 35721.78 | 7144.36 |
| 20 | 211324.20 | 327330.75 | 176103.50 | 292110.05 | 47426.44 | 39522.04 | 7904.41 |
| 21 | 221890.41 | 376430.36 | 184908.67 | 339448.63 | 52365.25 | 43637.71 | 8727.54 |
| 22 | 232456.62 | 432894.91 | 193713.85 | 394152.14 | 57713.98 | 48094.98 | 9619.00 |
| 23 | 243022.83 | 497829.15 | 202519.02 | 457325.35 | 63506.65 | 52922.21 | 10584.44 |
| 24 | 253589.04 | 572503.52 | 211324.20 | 530238.68 | 69780.11 | 58150.09 | 11630.02 |
| 25 | 264155.25 | 658379.05 | 220129.37 | 614353.18 | 76574.26 | 63811.88 | 12762.38 |
| 26 | 274721.46 | 757135.91 | 228934.55 | 711349.00 | 83932.32 | 69943.60 | 13988.72 |
| 27 | 285287.67 | 870706.30 | 237739.72 | 823158.35 | 91901.10 | 76584.25 | 15316.85 |
| 28 | 295853.88 | 1001312.24 | 246544.90 | 952003.26 | 126598.84 | 83776.07 | 42822.78 |
| 29 | 306420.09 | 1151509.08 | 255350.07 | 1100439.06 | 668716.69 | 91564.80 | 577151.89 |
| 30 | 316986.30 | 1324235.44 | 264155.25 | 1271404.39 | 1424235.44 | 100000.00 | 1324235.44 |

The output 50 next presents the user the option of viewing yearly lender comparisons, an example of which is shown in Table IV. The second column of Table IV indicates the additional amount of payments that the lender receives over the year by making the $120,000 Halbrook loan instead of the $100,000 standard loan. The third column and the fourth column indicate equity that the lender would have in the standard loan and the Halbrook loan, respectively, from year

TABLE IV-continued

| YR | Additional Payment (Cum.) | Equity (Std.) | Equity (Halbrook) | Difference in Equity |
|---|---|---|---|---|
| 19 | $33459.66 | $231576.54 | $542527.28 | $310950.74 |
| 20 | $35220.70 | $236581.46 | $591228.50 | $354647.04 |

TABLE IV-continued

| YR | Additional Payment (Cum.) | Equity (Std.) | Equity (Halbrook) | Difference in Equity |
|---|---|---|---|---|
| 21 | $36981.73 | $241270.96 | $645955.51 | $404684.55 |
| 22 | $38742.77 | $245618.86 | $707637.55 | $462018.69 |
| 23 | $40503.80 | $249596.82 | $777345.33 | $527748.51 |
| 24 | $42264.84 | $2S3174.11 | $856312.45 | $603138.35 |
| 25 | $44025.87 | $256317.49 | $945960.04 | $689642.55 |
| 26 | $45786.91 | $258990.95 | $1047925.05 | $788934.10 |
| 27 | $47547.94 | $261155.47 | $1164092.87 | $902937.39 |
| 28 | $49308.98 | $262768.83 | $1270567.28 | $1007798.45 |
| 29 | $51070.01 | $263785.27 | $889212.47 | $625427.20 |
| 30 | $52831.05 | $264155.25 | $316986.30 | $52831.05 |

Figure 20:
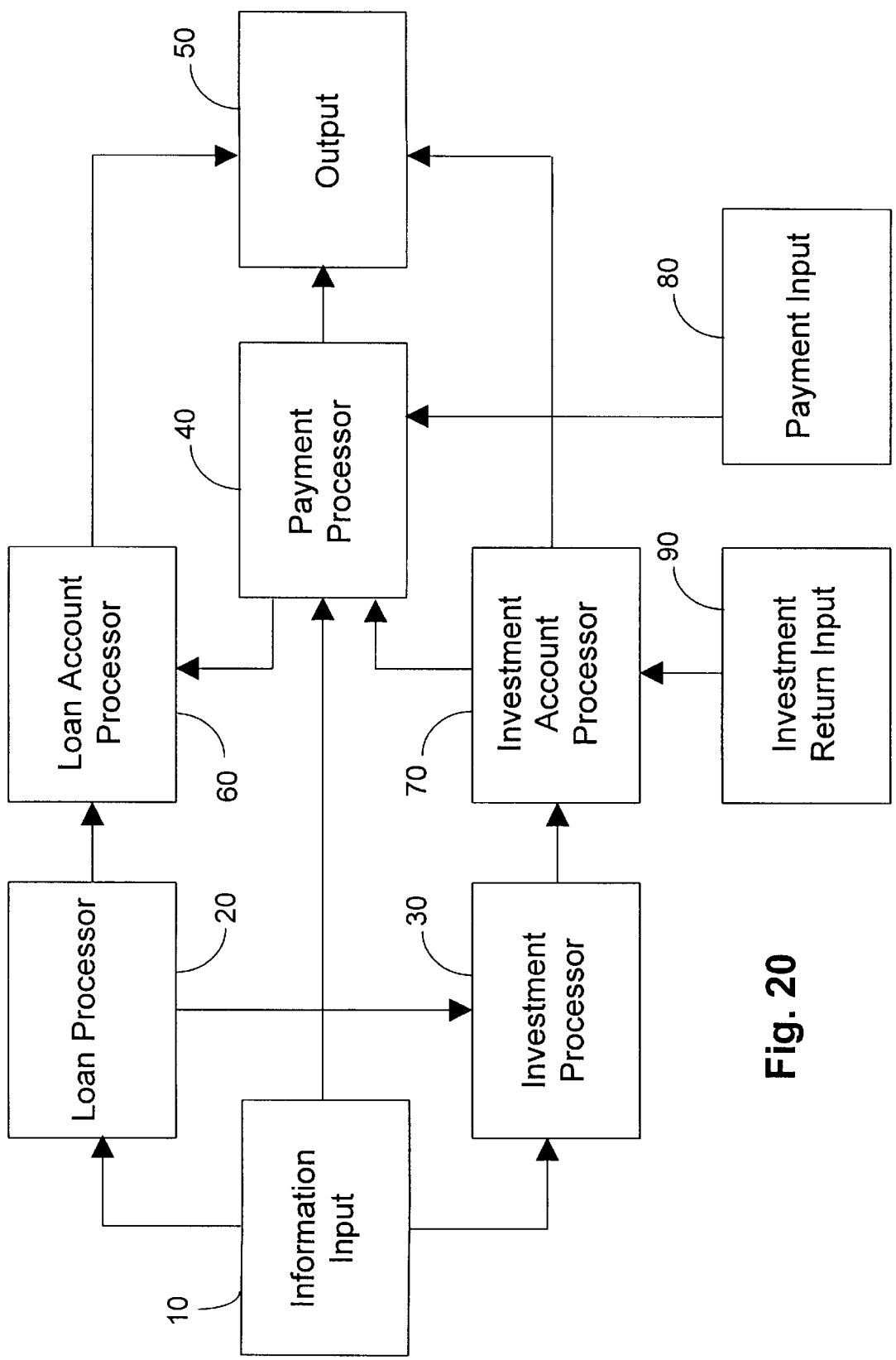
FIG. 20 is a functional block diagram of a data processing system according to an alternative embodiment of the invention.

An alternate embodiment of the invention, as shown in FIG. 20, operates in a similar fashion as the preferred embodiment, but also includes processing capacity to establish and manage loan and investment accounts. The information input 10, loan processor 20, investment processor 30, and output 50 of this embodiment operate as described above. As shown in FIG. 20, this alternate embodiment includes a loan account processor 60, which is preferably a computer microprocessor that executes a series of instructions to create and manage a loan account. The functions performed by the loan account processor 60 include creating the loan account for tracking the principal balance and the interest balance, and reducing the principal and interest balances as payments are received from the borrower.

Preferably, the loan processor 20 and the loan account processor 60 are implemented in one computer. Alternatively, the loan processor 20 and the loan account processor 60 may be implemented as separate computers that communicate over a network, such as a LAN, WAN, or the Internet.

With continued reference to FIG. 20, this alternate embodiment includes an investment account processor 70, which is preferably a computer microprocessor that carries out a series of instructions to create and manage an investment account. The investment account tracks the investment amount and the accumulated return on the investment over time. The investment account processor 70 receives information from the investment processor 30, including the investment loan amount and the expected rate of return on the investment, and uses this information to establish an investment account. For example, if the expected return on the investment is 5%, the investment account processor 70 may establish a certificate of deposit (CD) account with a bank. However, if the expected return on the investment is 15%, the investment account processor 70 may establish a mutual fund account with an investment company. Since the user may choose to distribute the investment loan amount to more than one investment, the investment account processor 70 is operable to establish and manage investment accounts with multiple financial institutions.

Preferably, the investment processor 30 and the investment account processor 70 are implemented in a single computer. Alternatively, the investment processor 30 and the investment account processor 70, may be implemented as separate computers that communicate over a network, such as a LAN, WAN, or the Internet.

In a preferred embodiment, the investment account processor 70 is operable to connect via a communication network with a wide variety of financial institutions. Thus, as an investment generates a return on the investment, such as periodic interest earned by a CD, or periodic dividends from a stock account, the investment account processor 70 receives the return on the investment from an investment return input 90.

Preferably, the investment return input 90 is a communication interface operable to connect to an investment institution, such as a bank, mutual fund management company, or other financial institution, where the investment has been made. On a periodic basis, the investment return input 90 automatically accommodates the transfer of funds from the investment institution to the investment account processor 70. Alternatively, the investment return input 90 is an input device, such as a computer keyboard, used to manually input the amount of the periodic return on the investment as it is received from the investment institution.

With continued reference to FIG. 20, the investment account processor 70 communicates the return on the investment to the payment processor 40. As discussed in greater detail below, the payment processor 40 then distributes the return in the investment as payments on the principal and interest amounts according to the borrower's wishes.

The payment processor 40 also receives payments from a payment input 80. In a preferred embodiment of the invention, the payment input 80 is a communication interface operable to connect to the borrower's bank, credit union, or other financial institution where the borrower maintains a deposit account, such as a checking or savings account. On a periodic basis, the payment input 80 automatically accommodates the transfer of funds from the borrower's deposit account to the payment processor 40. The payment processor 40 then distributes the funds as principal and interest payments to the loan account processor 60.

Alternatively, the payment input 80 is an input device, such as a computer keyboard, used to manually input a payment amount as a payment is received from the borrower. This form of payment input 80 may be used when the borrower's payment is made by cash or money order.

According to information supplied by the user via the information input 10, the payment processor 40 distributes payments from the payment input 80 and return on the investment from the investment account processor 70 to the loan account processor 60. A preferred embodiment of the invention provides for several different distribution options. For example, the payment processor 40 is operable to apply the return on the investment or the payment firstly toward the interest payment amount. If the return on the investment or payment exceeds the interest payment amount, the payment processor 40 then applies the excess of the return on the investment or payment toward the principal payment amount. The payment processor 40 is further operable to prioritize the distribution of the excess of the return on the investment or payment to different portions of the principal payment amount. For example, the excess may first be used to payoff a portion of the principal amount attributable to the base loan amount, and secondly to payoff a portion of the principal amount attributable to the investment loan amount. This exemplary prioritization of the return on the investment or payment is represented in the first row of Table V. Other possible distribution prioritization options provided by the payment processor 40 are also represented in Table V. The numeric values in Table V represent the order of distribution of the return on the investment or payment assigned by the payment processor 40.

TABLE V

| Option | Interest Payment Amount | | Principal Payment Amount | |
|---|---|---|---|---|
| | Base Loan Portion | Investment Loan Portion | Base Loan Portion | Investment Loan Portion |
| 1 | 1 | 1 | 2 | 3 |
| 2 | 1 | 1 | 3 | 2 |
| 3 | 1 | 2 | | |
| 4 | 2 | 1 | | |
| 5 | | | 1 | 2 |
| 6 | | | 2 | 1 |

Alternately, payments may be allocated to the different portions according to a predetermined percentage of the payment amount, or other criteria, rather than only if there is an excess in the payment amount.

Figure 21:
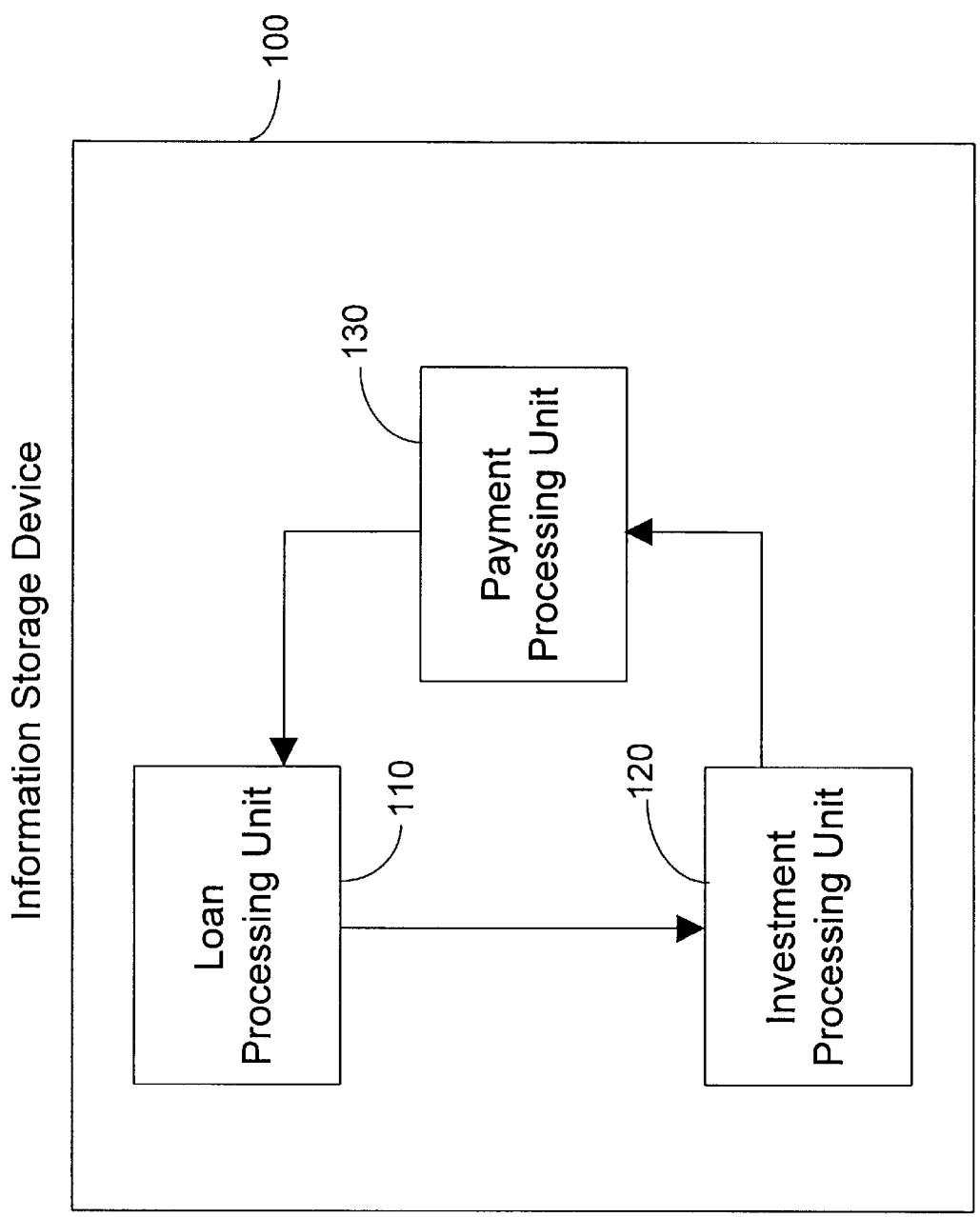
FIG. 21 is a functional block diagram of an information storage device according to an embodiment of the invention.

Shown in FIG. 21 is information storage device 100 according to another embodiment of the invention. Preferably, the information storage device 100 is a memory device such as a magnetic disc or optical disc that is readable by a compatible disc drive in a personal computer. Alternatively, the information storage device 100 maybe a compact disc read-only memory device (CD-ROM) that is readable by a CD-ROM drive, a magnetic 3.5 inch floppy disc, or other computer-readable information storage medium.

The information storage device 100 stores units of executable software instructions that, when executed by a computer processor, determine monetary amounts related to a loan. These executable units are portions of the memory of the storage device 100 where the software instructions are arranged in a computer-readable format.

With reference to FIG. 21, the executable units include a loan processing unit 110, an investment processing unit 120, and a payment processing unit 130. The loan processing unit 110 of the information storage device 100 comprises executable software instructions for carrying out the previously-described functions of the loan processor 20. The investment processing unit 120 comprises executable software instructions for carrying out the previously-described functions of the investment processor 30, and the payment processing unit 130 comprises executable software instructions for carrying out the previously-described functions of the payment processor 40. Thus, the information storage device 100 provides for transferring the executable units from one computer to another, so that the user may implement the financial data processing system as described above on any compatible computer processor.

It will be appreciated that the invention as described above comprehends numerous adaptations, rearrangements, and substitutions of parts, all of which are considered to be within the scope and spirit of the invention as described, and that the scope of the invention is only to be restricted by the language of the claims given below.

What is claimed is:

1. A financial management data processing system for determining monetary amounts related to a loan from a lender to a borrower, where the loan consists of a base loan amount to be used by the borrower and an investment loan amount to be invested in an investment, where the lender charges the borrower an interest amount at a loan interest rate over a loan term, and where the investment earns a return on the investment at a rate of return, the system comprising:

a) information input means for inputting the base loan amount, the investment loan amount, the loan interest rate, the rate of return on the investment, and the loan term;

b) first data processing means for:
      i) summing the base loan amount and the investment loan amount to produce a principal amount,
      ii) determining the interest amount based on the principal amount, the loan interest rate, and the loan term,
      iii) amortizing the loan based upon the loan interest rate and the loan term to determine an interest payment amount and a principal payment amount, and
      iv) determining a loan payment amount by combining the interest payment amount and principal payment amount;

c) second data processing means for determining the return on the investment based on the investment loan amount and the rate of return on the investment;

d) third data processing means for applying at least a portion of the return on the investment to reduce at least one of the principal amount and the interest amount; and e) output means for displaying results of determinations made by the first, second, and third data processing means.

2. The financial management data processing system of claim 1, further comprising:

a) fourth data processing means for
      i) creating a loan account that indicates the principal amount and the interest amount,
      ii) reducing the principal amount as the principal payment amount is received, and
      iii) reducing the interest amount as the interest payment amount is received;

b) fifth data processing means for creating an investment account that indicates the investment amount and the return on the investment; and c) the third data processing means further operable to transfer at least a portion of the return on the investment from the investment account to the loan account to reduce at least one of the principal amount and the interest amount.

3. The financial management data processing system of claim 1 wherein the third data processing means are further operable to apply at least a portion of the return on the investment toward the loan payment amount.

4. The financial management data processing system of claim 3 wherein the third data processing means are further operable to apply at least a portion of the return on the investment firstly toward the interest payment amount, and, if the return on the investment exceeds the interest payment amount, to apply an excess of the return on the investment secondly toward the principal payment amount.

5. The financial management data processing system of claim 3 wherein the interest payment amount is separable into a first portion attributable to the base loan amount and a second portion attributable to the investment loan amount, and wherein the third data processing means are further operable to apply at least a portion of the return on the investment firstly toward the first portion of the interest payment amount, and, if the return on the investment exceeds the first portion of the interest payment amount, to apply an excess of the return on the investment secondly toward the second portion of the interest payment amount.

6. The financial management data processing system of claim 3 wherein the interest payment amount is separable into a first portion attributable to the base loan amount and a second portion attributable to the investment loan amount, and wherein the third data processing means are further operable to apply at least a portion of the return on the investment firstly toward the second portion of the interest payment amount, and, if the return on the investment exceeds the second portion of the interest payment amount, to apply an excess of the return on the investment secondly toward the first portion of the interest payment amount.

7. The financial management data processing system of claim 3 wherein the principal payment amount is separable into a first portion attributable to the base loan amount and a second portion attributable to the investment loan amount, and wherein the third data processing means are further operable to apply at least a portion of the return on the investment firstly toward the first portion of the principal payment amount, and, if the return on the investment exceeds the first portion of the principal payment amount, to apply an excess of the return on the investment secondly toward the second portion of the principal payment amount.

8. The financial management data processing system of claim 3 wherein the principal payment amount is separable into a first portion attributable to the base loan amount and a second portion attributable to the investment loan amount, and wherein the third data processing means are further operable to apply at least a portion of the return on the investment firstly toward the second portion of the principal payment amount, and, if the return on the investment exceeds the second portion of the principal payment amount, to apply an excess of the return on the investment secondly toward the first portion of the principal payment amount.

9. A financial management system, comprising:
   a) determining a base loan amount,
   b) determining an investment loan amount,
   c) totaling the base loan amount and the investment loan amount to yield a total loan amount,
   d) amortizing the total loan amount to determine an interest payment amount and a principal payment amount, which together equal a loan payment amount,
   e) creating a base account,
   f) funding the base account with the base loan amount,
   g) creating an investment account,
   h) funding the investment account with the investment loan amount,
   i) investing the investment loan amount in an investment that provides a return on the investment, and
   j) applying the return on the investment toward the loan payment amount.

10. The financial management system of claim 9, wherein the step of applying the return on the investment toward the loan payment amount further comprises:
   a) applying the return on the investment firstly toward the interest payment amount, and
   b) applying the return on the investment secondly toward the principal payment amount.

11. The financial management system of claim 9, wherein the system further comprises the step of applying the return on the investment thirdly toward prepayment of the total loan amount.

12. The financial management system of claim 9, further comprising:
   a) receiving a payment equal to the loan payment amount, and
   b) applying the payment toward the loan payment amount.

13. The financial management system of claim 12, wherein the step of applying the payment toward the loan payment amount further comprises:
   a) applying the payment firstly toward the interest payment amount, and
   b) applying the payment secondly toward the principal payment amount.

14. The financial management system of claim 12, wherein the system further comprises the step of applying the payment thirdly toward prepayment of the total loan amount.

15. The financial management system of claim 10, wherein the step of applying the return on the investment firstly toward the interest payment amount further comprises applying the return on the investment firstly toward a first portion of the interest payment amount attributable to the base loan amount and secondly toward a second portion of the interest payment amount attributable to the investment loan amount.

16. The financial management system of claim 10, wherein the step of applying the return on the investment firstly toward the interest payment amount further comprises applying the return on the investment firstly toward a first portion of the interest payment amount attributable to the investment loan amount and secondly toward a second portion of the interest payment amount attributable to the base loan amount.

17. The financial management system of claim 10, wherein the step of applying the return on the investment secondly toward the principal payment amount further comprises applying the return on the investment firstly toward a first portion of the principal payment amount attributable to the base loan amount and secondly toward a second portion of the principal payment amount attributable to the investment loan amount.

18. The financial management system of claim 10, wherein the step of applying the return on the investment secondly toward the principal payment amount further comprises applying the return on the investment firstly toward a first portion of the principal payment amount attributable to the investment loan amount and secondly toward a second portion of the principal payment amount attributable to the base loan amount.

19. The financial management system of claim 9, wherein the system further comprises a computer program disposed on a computer-readable medium, including steps to be performed on a computer.

20. A computer-readable information storage device comprising executable units for implementing a financial management system for determining monetary amounts related to a loan from a lender to a borrower, where the loan consists of a base loan amount to be used by the borrower and an investment loan amount to be invested in an investment, where the lender charges the borrower an interest amount at a loan interest rate over a loan term, and where the investment earns a return on the investment at a rate of return, the information storage device comprising:
   a) a first executable unit for
      i) determining a principal amount by summing the base loan amount and the investment loan amount,
      ii) amortizing the loan based upon the loan interest rate and the loan term to determine an interest payment amount and a principal payment amount, and
      iii) determining a loan payment amount by summing the interest payment amount and the principal payment amount;
   b) a second executable unit for determining the return on the investment based on the investment loan amount and the rate of return on the investment; and
   c) a third executable unit for applying at least a portion of the return on the investment to reduce at least one of the principal amount and the interest amount.

* * * * *

UNITED STATES PATENT AND TRADEMARK OFFICE
CERTIFICATE OF CORRECTION

PATENT NO. : 5,987,436
DATED : Nov. 16, 1999
INVENTOR(S) : W. Bracey Halbrook

It is certified that error appears in the above-identified patent and that said Letters Patent is hereby corrected as shown below:

Columns 7-8, at "Table I", under column labeled "TOTAL Interest Paid" at line indicated as Month 132, after "$82727.4", delete "Z" and insert --2--.

Column 9, at "Table II", under the column labeled "Beginning Principal Balance" at line indicated as Month 342, before "5664.71" and after "$", delete "i", and insert --1--.

Column 11, line 18, before "100,000)" and after "loan (", insert --$--.

Column 13, at "Table IV-continued", under column labeled "Equity (Std.)" at line indicated as "YR 24", before "3174.11" and after "$2", delete "S" and insert --5--.

Signed and Sealed this

Twenty-sixth Day of September, 2000

Attest:

Q. TODD DICKINSON

*Attesting Officer*  *Director of Patents and Trademarks*